United States Patent
Tomlins et al.

(10) Patent No.: US 6,416,897 B1
(45) Date of Patent: Jul. 9, 2002

(54) TUBULAR SCREEN ELECTRICAL CONNECTION SUPPORT FOR SOLID OXIDE FUEL CELLS

(75) Inventors: Gregory W. Tomlins, Pittsburgh; Michael P. Jaszcar, Murrysville, both of PA (US)

(73) Assignee: Siemens Westinghouse Power Corporation

( * ) Notice: Subject to any disclaimer, the term of this patent is extended or adjusted under 35 U.S.C. 154(b) by 181 days.

(21) Appl. No.: 09/654,528

(22) Filed: Sep. 1, 2000

(51) Int. Cl.[7] .............................. H01M 8/12; H01M 8/24
(52) U.S. Cl. .......................................... 429/31; 429/32
(58) Field of Search .............................. 429/30, 31, 32, 429/34

(56) References Cited

U.S. PATENT DOCUMENTS

| 4,490,444 A | 12/1984 | Isenberg |
| 4,728,584 A | 3/1988 | Isenberg |
| 4,833,045 A | 5/1989 | Pollack et al. |
| 4,874,678 A | 10/1989 | Reichner |
| 4,876,163 A | 10/1989 | Reichner |
| 5,185,219 A | * 2/1993 | Ishihara et al. ............... 429/30 |
| 5,258,240 A | 11/1993 | Di Croce et al. |
| 5,273,838 A | 12/1993 | Draper et al. |
| 6,001,501 A | * 12/1999 | Collie ........................ 429/160 |

* cited by examiner

*Primary Examiner*—Patrick Ryan
*Assistant Examiner*—Jonathan Crepeau

(57) ABSTRACT

A solid oxide fuel assembly is made of fuel cells (16, 16', 18, 24, 24', 26), each having an outer interconnection layer (36) and an outer electrode (28), which are disposed next to each other with rolled, porous, hollow, electrically conducting metal mesh conductors (20, 20') between the fuel cells, connecting the fuel cells at least in series along columns (15, 15') and where there are no metal felt connections between any fuel cells.

12 Claims, 3 Drawing Sheets

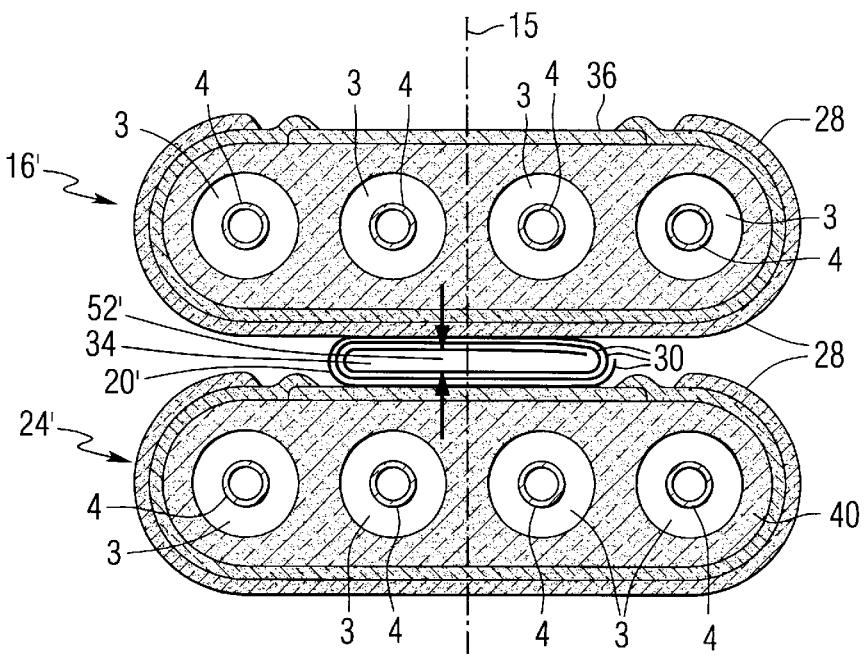

FIG. 3

| TABLE 1 - ELECTRICAL TESTING RESULTS ||||
| SAMPLE | TYPE OF Ni CONTACT | VOLTAGE DROP | COMMENTS |
| --- | --- | --- | --- |
| 1 | EXMET 3Ni5 5/0 * | 3.0 mV AT 100 Amp | 3 LOOPS (CIRCULAR) |
| 2 | EXMET 5Ni10 3/0 ** | 2.5 mV AT 100 Amp | 3 LOOPS (CIRCULAR) |
| 3 | STANDARD SINGLE FELT LOOP (HORSE SHOE SHAPED) | 4.1 mV AT 100 Amp | TYPE USED FOR THERMAL CYCLE TESTING |
| 4 | STANDARD FELT | 5.7 mV AT 100 Amp | STANDARD FELT USED BETWEEN CELLS |
| 5 | Ni SCREEN (100 μm WIRE DIA, ≈ 4 cm FOLDED LENGTH) | 37 mV AT 83.7 Amp | 4-FOLD ACCORDION STYLE |
| * 0.007 cm THICK NICKEL, 0.013 cm STRAND WIDTH, 5/0 MESH, BY EXMET CORP.  ** 0.013 cm THICK NICKEL, 0.026 cm STRAND WIDTH, 3/0 MESH, BY EXMET CORP. ||||

FIG. 5

TUBULAR SCREEN ELECTRICAL CONNECTION SUPPORT FOR SOLID OXIDE FUEL CELLS

GOVERNMENT CONTRACT

The Government of the United States of America has rights in this invention pursuant to Contract No. DE-FC-2697FT34139, awarded by the United States Department of Energy.

BACKGROUND OF THE INVENTION

1. Field of the Invention

This invention relates generally to strong, porous, thin, tubular improved electrical connectors and supports for solid oxide electrolyte fuel cells in a fuel cell generator.

2. Background Information

Square pitched, series-parallel interconnection of solid oxide fuel cells is well known, and taught in U.S. Pat. Nos. 4,490,444 and 4,833,045(Isenberg and Pollack et al., respectively). The fuel cells used usually contain a self-supported air electrode tube, where the air electrode is covered over about 300 degrees by a solid electrolyte film. Thus, there is a 60 degree wide axial strip down the length of the cell. This remaining 60 degrees of air electrode surface is covered by an interconnection strip, usually a lanthanum-chromite. As a top layer, fuel electrode covers the solid electrolyte over about 280 degrees of the electrolyte surface.

These cylindrical cells are placed in a square pitch, series-parallel connected array, wherein the air electrode of one cell is connected to the fuel electrode of the adjacent series-connected cell by a plated interconnection strip and a strip of 80% to 95% porous sintered nickel felt, which has a continuous core of fiber through its thickness, which is about 0.1 inch (0.25 cm). Other nickel felts provide parallel connections between the fuel electrodes of adjacent cells. The series path is essential for the generation of a practical DC stack voltage. The parallel connections provide paths by which the current can circumnegotiate any defective open circuit cells. Fuel flows axially in the passages forced between the groups of cells. This has been the standard design for over fifteen years.

In this standard design, the primary subassemblies from which a solid oxide fuel cell generator is formed are cell bundles. Presently, bundles contain twenty-four cells on a 8×3 cell matrix. Eight cells are series connected to form one row of a three-row bundle. The three rows are connected in parallel through the connection of each cells in the row with the adjacent cell in the next row. Between the nickel plated lanthanum-chromite interconnection strip of one cell and the nickel fuel electrode of the next cell in a row, any two cells are presently series connected by a nickel felt of a rectangular cross-section (approximately 6.3 mm×6.3 mm). These felts are pressed to a thickness of between about 0.1 inch (0.25 cm) and about 0.25 inch (0.63 cm) and are initially about 80% to 95% porous. Parallel connection is also currently accomplished by similar felt strips. In this case, the felts connect the fuel electrodes of adjacent cells. Along the length of a cell, eight felts of 185-mm length are used to form a series connection, and four felts of 185-mm length are used to accomplish a parallel connection. A total of 280 felt strips are used per bundle. This means of electrical connection is effective; however, it is costly in terms of materials and is very labor intensive. Furthermore, this arrangement is not conducive to automation.

Improvements to this standard design have been suggested. Reichner, in U.S. Pat. No. 4,876,163, disclosed spiral or folded row connections within a cylindrical generator, using U-shaped connections. This design, however, substantially decreases gaseous fuel flow between the outer electrodes of the cells. U.S. Pat. No. 5,273,838 (Draper et al.) eliminated one nickel felt connector from each group of four cells, where alternate cells of a first row had no electrical connection of their interconnections to cells in an adjacent row. This design helped to eliminate the potential for bowing when using newer, longer one meter cells. This design may, however, decrease the overall strength of the twenty-four cell subassemblies.

In an attempt to simplify generator design and reduce assembling costs, DiCroce et al., in U.S. Pat. No. 5,258,240, taught a thick, flat-backed, porous metal fiber felt connector strip, having a crown portion of metallic fiber felt conforming to the surface of its contacting fuel cell. These porous felt connectors could be used as a series of thin strips across a small part of the fuel cell length, or as a porous sheet extending along the entire axial length of the fuel cells. In order to provide structural integrity, since there are no side connections, a plurality of cells would have to be laminated to provide a thickness of 0.125 inch (0.62 cm), thereby reducing porosity to about 5 to 10%. The strips could also be made of a solid nickel foil or a composite of foil and porous felt; they could also have two opposing fuel cell conforming surfaces, as shown in FIG. 3 of that patent. In U.S. Pat. No. 4,874,678 (Reichner) felts were used as connectors between elongated type tubular fuel cells having a plurality of axial interior oxidant feed tubes.

The use of fibrous felts still allowed potential densification during prolonged use and were difficult to fashion to exact dimensions, while the use of foils did not provide adequate strength.

In a rather radical fuel cell design, Isenberg, in U.S. Pat. No. 4,728,584, taught spaced apart fuel cells interconnected by solid wire connectors. In fuel cell bundles where close spacing is required, the solid wire would cause significant thermal expansion and pressure problems, leading to fuel cell cracking. Draper et al., in U.S. patent application Ser. No. 09/631,096 (filed on Aug. 3, 2000, Attorney Docket No. 00E7705US, 283139-01096), now U.S. Pat. No. 6,379,831, taught expanded nickel mesh corrugated into crown portions and shoulder portions and disposed across a complete layer of fuel cells. While providing excellent support and resilience, this design required substantial amounts of forming and molding, adding significantly to the costs of the fuel cell generator.

What is needed is a highly porous nickel support made of a single piece, disposed between individual fuel cells, to connect all contacting fuel cells electrically.

SUMMARY OF THE INVENTION

Therefore, it is a main object of this invention to provide a thin, strong, porous electrical connector for solid oxide electrolyte fuel cells in a fuel cell generator.

It is also a main object of this invention to provide an improved, inexpensive connector for fuel cells in a fuel cell generator that will retain its resilience throughout its life.

These and other objects of the invention are accomplished by providing a solid oxide fuel cell assembly comprising at least columns of fuel cells, each fuel cell having an outer interconnection and an outer electrode, where the fuel cells are disposed next to each other with rolled, porous, hollow, electrically conducting metal mesh conductors between fuel cells, connecting the fuel cells at least in a series along columns, and where there are no metal felt connections between any fuel cells. The mesh is preferably plural rolled and can be expanded metal mesh or woven metal mesh, preferably nickel or copper metal mesh having from two to six layers, with the rolled structure mentioned previously. This invention is meant to cover the tubular type fuel cells as well as the elongated type fuel cells shown in Reichner U.S. Pat. No. 4,874,678, where the term tubular fuel cell is meant to also include this latter type design.

This provides a conductor that accommodates differential thermal expansion shear stress and provides shock resistance. It also provides a very strong, springy, thin, and stiff electrical connector support for tubular solid oxide fuel cells, having high mechanical durability and resilience, and which will last substantially longer than other types of connectors and is inexpensive to manufacture. It also has a low resistance loss through its thickness.

BRIEF DESCRIPTION OF THE DRAWINGS

In order that the invention can be more clearly understood, convenient embodiments thereof will now be described, by way of example, with reference to the accompanying drawings, in which:

FIG. 3 is a cross-sectional view of another embodiment of the fuel cell assembly, utilizing flattened tubular or elongated fuel cells;

FIG. 5 is a table showing results from the Example.

DESCRIPTION OF THE PREFERRED EMBODIMENTS

In the preferred practice of the present invention, natural gas or an incompletely combusted gas is employed as a fuel gas on the plenum side of a solid oxide fuel cell (SOFC) generator. Air is preferably employed as an oxidizing gas flowing within the tubular fuel cells. Also, other fuel gas and oxidizing gases may be employed in place of natural gas and air.

Figure 1:
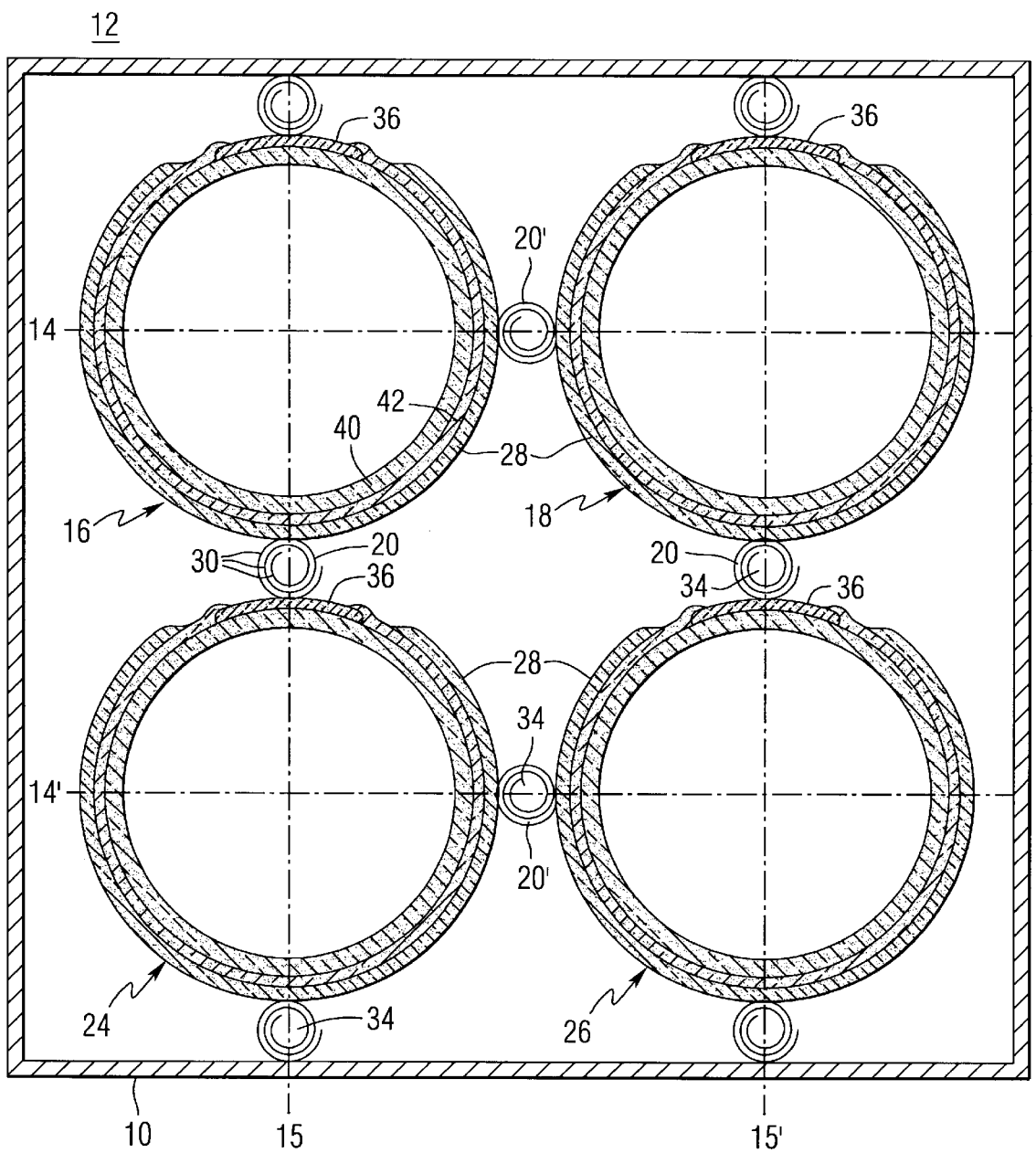
FIG. 1 is a cross-sectional view of one embodiment of the fuel cell assembly or bundle of this invention, showing four cells of a bundle, connected horizontally in rows and vertically in columns.

FIG. 1 shows a 2×2 cell array of tubular fuel cells in a plenum 10 of a generator 12 embodying the present invention. The fuel cells are axially elongated tubes. The array comprises rows of fuel cells, such as, for example, a first row 14 including fuel cells 16 and 18, which are electrically connected in parallel by the hollow, rolled electrically conducting member (conductor) 20'. Fuel cells 16 and 18 are also electrically connected in series (in columns 15 and 15') with the fuel cells in the adjacent second row 14', including fuel cells 24 and 26, by the conductor 20, which contacts their outer fuel electrodes 28 and the interconnection layer 36. Both conductors 20 and 20' are shown loosely coiled, for illustrative purposes. Thus, the mesh conductors connect the fuel cells in series and in parallel.

Figure 2:
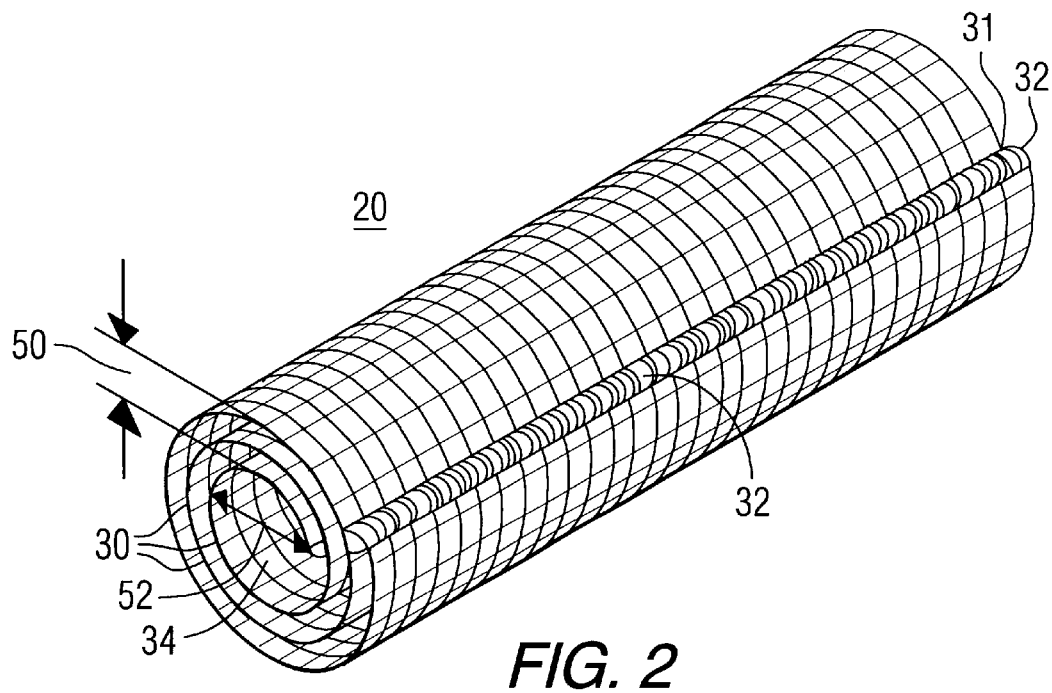
FIG. 2 is a three-dimensional view of one embodiment of the plural rolled, porous, tubular, hollow metal mesh conductors, used as cell connection supports, shown loosely coiled for illustrative purposes.

The conducting members 20 and 20' are a thin sheet of porous mesh, rolled on itself to form plural layers bonded at the mesh end 31 by weld bead 32, as shown in FIG. 2. Of course, a single roll could be used if of an appropriate thickness and any other means suitable to hold the shape of the rolled mesh can be substituted for weld bead 32. The conductors 20 and 20' are shown loosely rolled (for illustrative purposes), but will be tightly coiled in actual use, so that all the layers intimately contact each other. Also shown is the hollow, axially elongated, unfilled volume 34 between the interconnect material 36 and the outer electrodes 28.

All of the fuel cells comprise an inner self-supported air electrode 40, a solid electrolyte 42 (which is oxygen ion conductive at over 1000° C.), an outer fuel electrode 28 and an outer interconnection layer 36, which physically and electrically contacts the air electrode, as shown in FIG. 1. All of the interconnections 36 of the second row 14' of cells face all of the outer electrodes 28 of the first row 14 of cells. Thus, the interconnection of cell 24 will face the outer electrode of cell 16 within the column 15 of cells.

The electrical conducting connection support member 20 consists of rigid mesh, either woven or expanded, preferably of nickel, which is over about 40% porous, preferably 55% to 85% porous, each mesh layer having a thickness between 0.008 cm (0.003 inch) and 0.038 cm (0.015 inch), preferably from 0.008 cm (0.003 inch) to 0.013 cm (0.005 inch). Over the 0.038 cm range, the mesh becomes difficult to roll. Under 0.008 cm, structural integrity suffers. In order to provide adequate stiffness, the number of layers, or plural rolls 30 can range from one to six depending on layer thickness 50, but preferably two to five, layers, with three layers (30) being shown in the Figures. In the elongated type fuel cells one to three layers may be preferred. The ratio of total layer thickness 50 to the smallest inside diameter or distance 52 is from 1:4 to 1:15, that is, the smallest inner diameter is 4–15 times larger than the total layer thickness, which total layer thickness can include up to six separate layers. Preferably that ratio will vary from 1:6 to 1:10. The smallest inside diameter or distance 52 will generally be the circular inside diameter as shown in FIG. 2 for tubular fuel cells used in FIG. 1 but will be the flattened distance 52' shown in the flattened fuel cell design of FIG. 3. The mesh must be at least 40% porous, so that fuel can pass easily outside the cells near the fuel electrodes 28, as well as to enable drying of a nickel particle-filled organic-based adhesive, not shown, which may be used initially to bond the conducting members 20 and 20' to each of the fuel cells. The organic part of the adhesive, preferably an epoxy resin filled with about 40 wt. % to 80 wt. % fine nickel or copper particles, is burned off (or vaporized) during a subsequent heating/sintering step at about 1000° C. to 1200° C., prior to or after the fuel cell bundle is placed in the generator, that is, such sintering can occur at generator startup. Epoxy resin volatiles, in particular, have been found to have no adverse effect on fuel cell properties.

The plural rolled connector support conducting member 20 has a very effective spring-like effect and provides superior shock absorbing qualities, as compared to metal felts. Additionally, the member 20 should not be substantially affected by prolonged operation (for example, of twenty four months or more) at temperatures up to 1200° C., and will not shrink or slump (that is, densify and decrease in thickness), as will metal felts.

Figure 4:
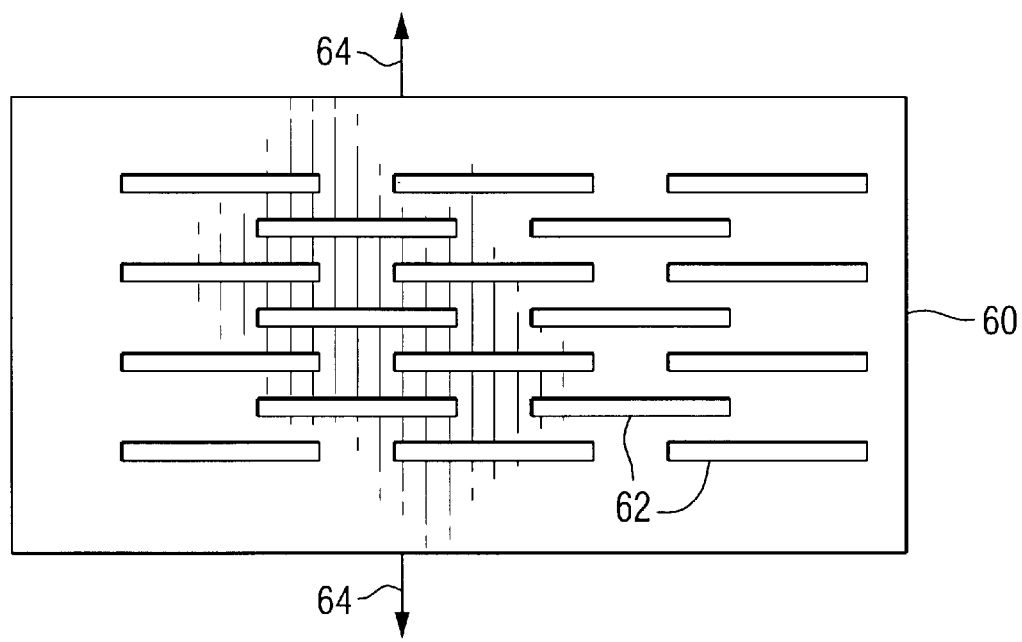
FIG. 4 is a top view of a cut out sheet of metal before being expanded to form an expanded sheet, which can then be formed to make a stiff embodiment of the plural rolled, hollow structure used in this invention.

The nickel or copper used to form the connector 20 can be woven to form a mesh fabric, providing a very springy structure. For more support, the mesh can be made of expanded foil or sheets of nickel. FIG. 4 shows the initial slicing of nickel foil 60 to form spaced apart, long rectangular slits 62 through the foil. The foil 60 is then expanded, as shown by the arrows 64, to provide a porous, expanded, diamond-shaped mesh structure. At this point, the open mesh is work hardened and must usually be softened, generally by annealing (normally by heating at between about 600° C. and 1200° C.) to recrystallize the grain structure and soften the mesh, so that it can be easily rolled. The tight rolling on a removable mandrel (to form the hollow, tubular structure shown) again work hardens portions of the mesh, making it stiff, yet resilient, and very strong, yet porous. FIG. 3 shows one embodiment of a series electrical connection along column 15 of fuel cells 16' and 24', which have an elongated configuration as shown with a plurality of interior oxidant conduits 3 or chambers with oxidant feed tubes 4 also shown. The term elongated will include any type of flattened tubular cell one type of which is shown in FIG. 3. Alternatively, a single elongated oxidant conduit can replace the plural conduit 3 so that the elongated cell configuration is in no way limited to the design of FIG. 3. The air electrode 40 is shown in FIG. 3 as a relatively massive interior supporting structure but can be of thin walled or other designs. The conductor 20' is plural, oval shaped, rolled, porous and hollow although a single roll could be used if of an appropriate thickness. Layers 30 are shown as well as hollow, unfilled volume 34. The conductor is still of the type shown in FIG. 2 but will be flattened as shown in FIG. 3 to provide good contact between the outer interconnection and outer electrode. In this case the "smallest inside diameter" value will be 52', the distance within volume 34 shown by the arrows in FIG. 3. The layer thickness of the conductor 20 would be the same as shown in FIG. 2 as 50.

EXAMPLE

Expanded nickel mesh, having diamond-shaped openings, about 65% porous and 0.013 cm (0.005 inch) thick, was annealed and then wrapped around a steel mandrel for three turns. The end of the outside mesh was then spot welded to form the plural layered, axially elongated, hollow, tubular conductor to be used. The thickness was about 0.039 cm and the inside diameter was about 0.48 cm. The mandrel was then removed. The inside starting end of the mesh remained in place with excellent nickel-to-nickel contact between the layers of mesh. Each mesh structure (which was similar to that shown in FIG. 2) was coated on the contact area only with a bead of epoxy cement admixed with about 60 wt. % small nickel particles. The rolled mesh was then attached to small (that is, about 10 cm thick long) nickel plates. These samples were compared to the felts currently used in bundle production, which are about 30% porous and are pressed to a width of about 0.6 cm×0.4 cm. A nickel felt loop 0.635 cm in width and 0.635 cm thick was also tested. As a further comparison, a woven nickel screen (made from wires with a diameter of 100 micrometers) about 3.2 cm long was folded four times to provide a four-fold accordion 6 mm long. All of the comparative samples were attached to nickel plates with 10 cm lengths. The voltage drop was measured by placing a low voltage power supply across the top and bottom nickel bars and measuring the voltage difference at 100 A. FIG. 5 shows the results of the electrical testing as Table 1.

Based on the results of the electrical testing, it was discovered that the electrical performance of the rolled nickel mesh, samples 1 and 2 of Table 1, FIG. 5, is actually superior to the nickel felt currently used, having a lower voltage drop.

Following nickel contact testing, slightly larger samples (that is, about 13 cm) were fabricated for mechanical testing, to determine if the nickel mesh materials are more robust to high shear loads than nickel felt. The results of mechanical testing indicated that the nickel mesh materials, attached to the nickel bars using either nickel slurry or nickel epoxy, are capable of enduring much higher loads than present felts.

What is claimed is:

1. A solid oxide fuel cell assembly comprising at least columns of fuel cells, each fuel cell having an outer interconnection and an outer electrode, where the fuel cells are disposed next to each other with rolled, porous, hollow, electrically conducting metal mesh conductors between fuel cells, connecting the fuel cells at least in series along columns, and where there are no metal felt connections between any fuel cells.

2. The solid oxide fuel assembly of claim 1, wherein the mesh conductors are made of a material selected from nickel and copper.

3. The solid oxide fuel assembly of claim 1, wherein the mesh conductors are made of nickel.

4. The solid oxide fuel assembly of claim 1, wherein the mesh conductors are expanded nickel mesh having diamond-shaped openings, and the metal mesh conductors are plural rolled and tubular.

5. The solid oxide fuel assembly of claim 1, wherein the mesh conductors are over 40% porous, the assembly also contains rows of fuel cells and the mesh conductors also connect the fuel cells in parallel along rows.

6. The solid oxide fuel assembly of claim 1, wherein the mesh conductors contain from one to six layers, and wherein the mesh is from 0.008 cm to 0.038 cm thick.

7. The solid oxide fuel assembly of claim 1, wherein the mesh conductors have a spring-like effect providing shock resistance to the fuel cells.

8. The solid oxide fuel assembly of claim 1, wherein the mesh conductors will not shrink or slump during prolonged operation at temperatures of up to 1200° C.

9. The solid oxide fuel assembly of claim 1, wherein the ratio of total layer thickness to smallest inside diameter is from 1:4 to 1:15.

10. The solid oxide fuel assembly of claim 1, wherein the mesh conductors contain from two to five layers, and wherein each mesh layer is from 0.008 cm to 0.013 cm thick.

11. The solid oxide fuel assembly of claim 1, wherein the fuel cells have an elongated configuration and the metal mesh conductors are oval shaped.

12. The solid oxide fuel assembly of claim 11, wherein the fuel cells are elongated and have a plurality of interior oxidant conduicts and are connected in series along columns.

* * * * *